United States Patent
Nitoh et al.

(10) Patent No.: US 6,249,424 B1
(45) Date of Patent: Jun. 19, 2001

(54) MONOLAYER CAPACITOR ELEMENT AND SOLID ELECTROLYTIC MULTILAYER CAPACITOR

(75) Inventors: Hiroshi Nitoh; Wataru Minamida; Atsushi Sakai; Takashi Ichimura, all of Omachi (JP)

(73) Assignee: Showa Denko K.K., Tokyo (JP)

( * ) Notice: Subject to any disclaimer, the term of this patent is extended or adjusted under 35 U.S.C. 154(b) by 0 days.

(21) Appl. No.: 09/433,877

(22) Filed: Nov. 4, 1999

Related U.S. Application Data

(63) Continuation of application No. PCT/JP99/03096, filed on Jun. 10, 1999.
(60) Provisional application No. 60/107,003, filed on Nov. 4, 1998.

(30) Foreign Application Priority Data

Jun. 11, 1998 (JP) .................................... 10-163912

(51) Int. Cl.⁷ ...................................... H01G 9/00
(52) U.S. Cl. ............................ 361/523; 361/524; 361/528
(58) Field of Search ................................... 361/508, 509, 361/510, 516–517, 523, 524, 528–529, 532–533, 535

(56) References Cited

U.S. PATENT DOCUMENTS

| | | | |
|---|---|---|---|
| 5,005,107 | * | 4/1991 | Kobashi et al. ..................... 361/540 |
| 5,428,500 | * | 6/1995 | Nishiyama et al. .................. 361/525 |
| 5,471,365 | * | 11/1995 | Nakamura et al. ................... 361/523 |
| 5,621,608 | * | 4/1997 | Arai et al. ............................ 361/525 |
| 5,790,368 | * | 8/1998 | Naito et al. .......................... 361/523 |

* cited by examiner

Primary Examiner—Anthony Dinkins
(74) Attorney, Agent, or Firm—Sughrue, Mion, Zinn, Macpeak & Seas, PLLC

(57) ABSTRACT

The present invention provides a solid electrolytic multilayer capacitor excellent in yield and capability, and provides a monolayer capacitor element for use in the manufacture of the solid electrolytic multilayer capacitor. In the multilayer solid electrolyte capacitor of the present invention, a solid electrolytic multilayer capacitor 25 in which a plurality of monolayer capacitor elements 7 are stacked such that the anode areas 11 aligned in the same direction are stacked and bonded onto a lead frame 9 on the anode side and the cathode areas are stacked and bonded onto a lead frame 8 on the cathode side so as to have an unfolded fan shape widening toward the distal end of the cathode area from the anode area 11 side, to provide a multilayer capacitor element 19 and the periphery of the multilayer capacitor element 19 that are covered and sealed with an armoring resin 23. The monolayer capacitor element 7 preferably has a constitution such that the end part of the anode substrate 1 having thereon a dielectric oxide layer 2 worked out to an anode area 11, the cathode area 6 is formed by providing a solid electrolyte layer 4 on the dielectric oxide layer 2 in the area exclusive of the anode area 11 and an electrically conducting layers 5 and 6 on the solid electrolyte layer 4, and the thickness $S_2$ at the distal end of the cathode area is larger than the thickness $S_1$ at the base part of the cathode area.

14 Claims, 5 Drawing Sheets

MONOLAYER CAPACITOR ELEMENT AND SOLID ELECTROLYTIC MULTILAYER CAPACITOR

CROSS REFERENCE TO RELATED APPLICATIONS

This Application is a Continuation Application of PCT/JP99/02937, filed June 2, 1999, pursuant to the provisions of 35 U.S.C. § 111. This application is also an Application filed under 35 U.S.C. (a) claiming benefit pursuant to 35 U.S.C. § 119(e)(1) of the filing date of Provisional Application 60/107,001 filed Nov. 4, 1998. Additional priority is also claimed under 35 U.S.C. § 365(c) of International Application No. PCT/JP99/03096 filed Jun. 11, 1998.

BACKGROUND OF THE INVENTION

1. Field of the Invention

The present invention relates to a solid electrolytic capacitor, particularly a solid electrolytic multilayer capacitor, using an organic material such as an electrically conducting polymer, or an inorganic material such as a metal oxide, as the solid electrolyte. The present invention further provides a monolayer capacitor element for manufacturing a solid electrolytic multilayer capacitor.

2. Description of Related Art

In the manufacture of a solid electrolytic multilayer capacitor comprising the stacked monolayer of capacitor element using a conductive polymer (also called an electrically conducting polymer) or and the like, as the solid electrolyte therein, when the plural monolayer capacitor elements are stacked such that respective cathode areas are laid one on another to run parallel with each other, the anode areas must be bent so as to allow spot welding because each cathode area formed by providing a solid electrolyte layer and an electrically conducting layer in sequence has a thickness larger than that of the anode area. Due to this, stress concentrates in the vicinity of the boundary between the anode area and the cathode area of the monolayer capacitor element, and as a result, the capacitor performance deteriorates. Various attempts have been made to overcome this problem.

For example, in order to eliminate this difference between the thickness of the cathode area and the anode area, a method of inserting a metal sheet having a thickness corresponding to the space between respective anode areas of the plurality of monolayer capacitor elements during stacking of the monolayer capacitor elements (see, Japanese Unexamined Patent Application, No. Hei 5-205984), a method of forming an insulating resin layer in the space between respective anode areas and connecting those anode areas through a fine metal line or and the like, (see, Japanese Unexamined Patent Application, No. Hei 6-29163, and Japanese Unexamined Patent Application, No. Hei 6-84716) and a method of dividing a lead frame into pieces corresponding to respective anode area sites are known (see, Japanese Unexamined Patent Application No. Hei 4-167417).

SUMMARY OF THE INVENTION

However, these methods for eliminating the problem of the difference in the thickness so as to prevent the concentration of stress from occurring in the vicinity of the boundary between the anode area and the cathode area during stacking are disadvantageous due to the increase in the working steps and the rise in the cost for processing the materials, and the like. Furthermore, as a result of the increase in the working steps, the monolayer capacitor element is more frequently ruptured or reduced in the capability by the mechanical stress or and the like, during the handling, and this causes a decrease in the yield during manufacture of multilayer capacitors or deterioration in the capability.

The present invention has been created for solving these problems. The object of the present invention is to provide a high-performance and high-capacity solid electrolytic multilayer capacitor and prevent the reduction in yield in the manufacture of the multilayer capacitor by preventing the concentration of stress in the vicinity of the boundary between the anode area and the cathode area from occurring during stacking and thereby obtaining a multilayer capacitor excellent in yield and having superior capability. Furthermore, the present invention provides a monolayer capacitor element suitable for manufacturing the above-described solid electrolytic multilayer capacitor.

The monolayer capacitor element of the present invention is a monolayer capacitor element comprising an anode allocated to an end part of an anode substrate comprising a tabular valve-acting metal having formed on the surface thereof a dielectric oxide layer, and a cathode area formed by sequentially providing a solid electrolyte layer on the dielectric oxide layer exclusive of the anode area and thereon an electrically conducting layer, in which the thickness at the distal end part of the cathode area is larger than the thickness at the base part of the cathode area.

The solid electrolytic multilayer capacitor of the present invention is a solid electrolytic multilayer capacitor comprising a multilayer capacitor element obtained by stacking a plurality of monolayer capacitor elements, each of which comprises an anode allocated to an end part of an anode substrate further comprising a tabular valve-acting metal having a dielectric oxide layer formed on the surface thereof, and a cathode area formed by sequentially providing a solid electrolyte layer on the dielectric oxide layer exclusive of the anode area and thereon an electrically conducting layer, such that the anode areas aligned in the same direction are stacked and bonded onto a lead frame on the anode side and the cathode areas are stacked and bonded onto a lead frame in the cathode side by forming an electrically conductive adhesive layer so as to have an unfolded fan shape that widens from the anode area side toward the distal end of the cathode area, in which the periphery of the multilayer capacitor element is covered and sealed with an armoring resin.

In the above-described solid electrolytic multilayer capacitor, the electrically conducting adhesive layer is preferably formed in the range of 80% or less of the cathode area length from the distal end of the cathode area. Furthermore, the multilayer capacitor element is preferably obtained by stacking under pressure a plurality of monolayer capacitor elements.

Also, in the above-described solid electrolytic multilayer capacitor, the monolayer capacitor element is preferably a monolayer capacitor in which the thickness at the distal end of the cathode area is larger than the thickness at the base part of the cathode area. Furthermore, it is preferred that one cathode area and another cathode area of the monolayer capacitor elements in plurality or a cathode area and the lead frame in the cathode side are stacked and bonded by an electrically conducting adhesive layer, and that the thickness of the electrically conducting adhesive layer at the distal end part of the cathode is larger than that at the base part of the cathode area.

Furthermore, in the above-described solid electrolytic multilayer capacitor, the solid electrolyte layer is preferably formed using an electrically conducting polymer.

PREFERRED EMBODIMENTS

Figure 1:
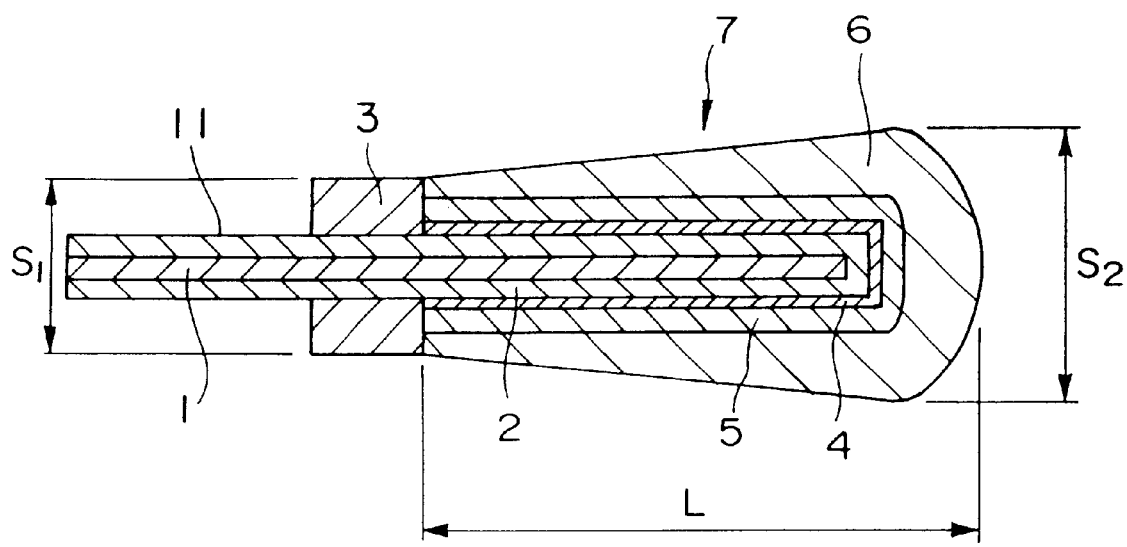
FIG. 1 is a cross-sectional view showing an example of a monolayer capacitor element according to the present invention.
Figure 2:
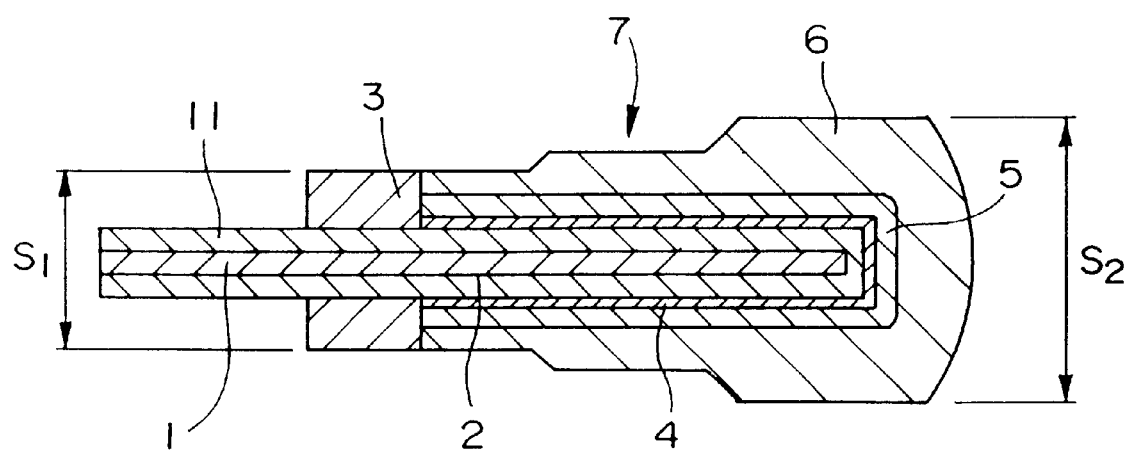
FIG. 2 is a cross-sectional view showing another example of a monolayer capacitor element according the present invention.

FIGS. 1 and 2 are each a cross-sectional view showing an example of a monolayer capacitor element according to the present invention. In FIG. 1, the monolayer capacitor element is a monolayer capacitor element comprising an anode area 11 allocated to an end part of an anode substrate 1 comprising a tabular valve-acting metal having formed thereon a dielectric oxide layer 2, and a cathode area formed by sequentially providing a solid electrolyte layer 4 and thereon electrically conducting layers, 4, 5 on the dielectric oxide layer 2 exclusive of the anode area 11 and the insulating layer 3, in which the thickness $S_2$ at the distal end part of the cathode area is larger than the thickness $S_1$ at the base part of the cathode area. Thus, in the monolayer capacitor element, the thickness of the cathode area gradually increases in the direction from the anode area 11 side toward the distal end of the cathode area.

In addition, the monolayer capacitor element shown in FIG. 2 has a cathode part whose thickness increases stepwise.

Figure 9:
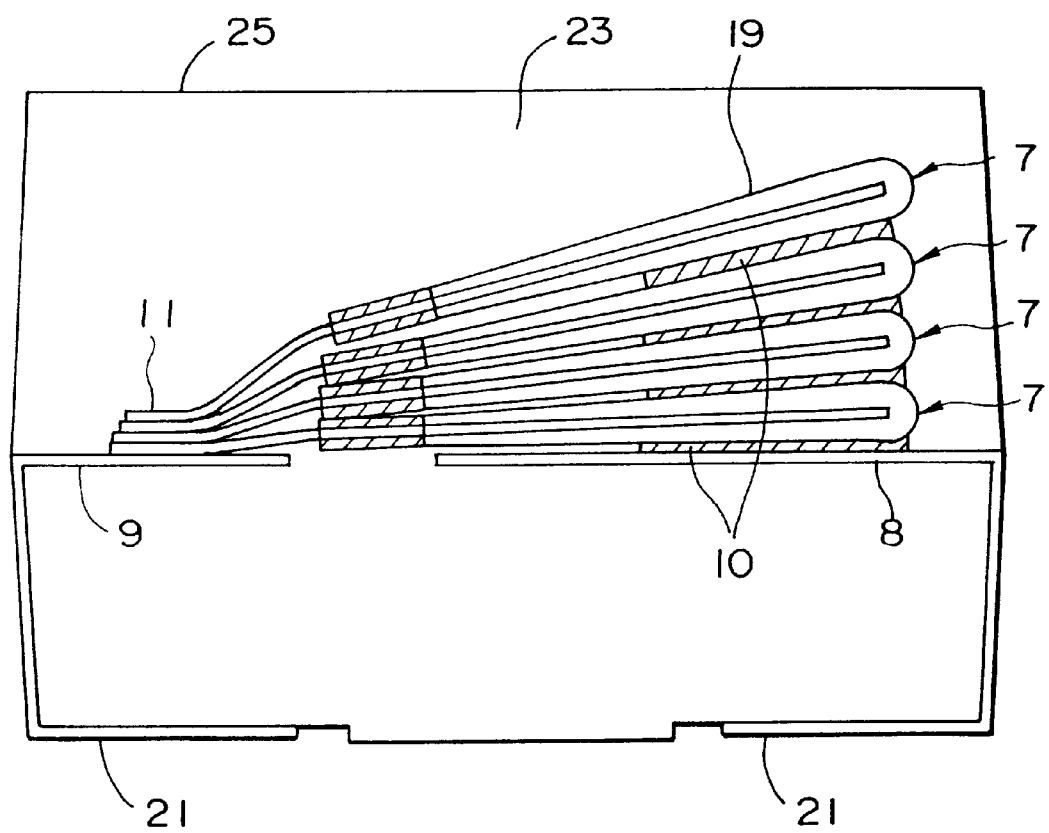
FIG. 9 is a cross-sectional view showing an example of a solid electrolytic multilayer capacitor according to the present invention.

FIG. 9 is a cross-sectional view showing an example of a solid electrolytic multilayer capacitor of the present invention. This is a solid electrolytic multilayer capacitor using a multilayer capacitor element obtained by stacking a plurality of monolayer capacitor elements shown in FIG. 1.

In the multilayer solid electrolytic capacitor of the present invention, the number of the stacked monolayer capacitor elements depends on the thickness of the monolayer capacitor and the design for the thickness of the electrically conducting paste or requirements performance, the shape of the stacking (for example, the shape of the stacking on both sides in FIG. 6 or the shape of stacking on a single surface in FIG. 4, and the like), and normally 2~about 20 layers are used, and preferably 2~12 layers are used.

The solid electrolytic multilayer capacitor 25 shown in FIG. 9 is a solid electrolytic multilayer capacitor in which four sheets of monolayer capacitor elements 7 are stacked onto a multilayer capacitor element 19 such that the anode areas 11 aligned in the same direction (left side) are stacked and bonded onto a lead frame 9 on the anode side by bending a part of each anode area 11 in the same direction (upper right direction) so that the anode area 11 comes close to the lead frame 9 on the anode side, the cathode areas are stacked and bonded onto a lead frame 8 on the cathode side to have an unfolded fan shape widening toward the distal end of the cathode area from the anode area 11 part, in which the periphery of the multilayer capacitor element 19 is stacked and bonded by an electrically conductive adhesive layer 10.

In the multilayer solid electrolyte capacitor 25, as a monolayer capacitor element 7, as shown in FIG. 1, by adding a tapered gradient to the cathode area, a monolayer capacitor element in which the thickness $S_2$ of the distal end part of the cathode area is larger than the thickness $S_1$ of the base part of the cathode area can be used. In addition, the shape of the multilayer capacitor elements 19 for manufacturing the multilayer solid electrolytic capacitor 25 are made in the shape of an unfolded fan.

The cathode and anode lead frames 8 and 9 may be constituted using, for example, a well-known iron base or copper base alloy.

The principle of the present invention is described below.

In the present invention, in obtaining a multilayer capacitor element 19 by stacking a plurality of monolayer capacitor elements 7, respective cathode areas or a cathode area and the lead frame are connected through an electrically conductive adhesive layer (using an electrically conducting paste) and respective anode areas or an anode area 11 and the lead frame are connected by spot welding or laser welding.

Figure 7:
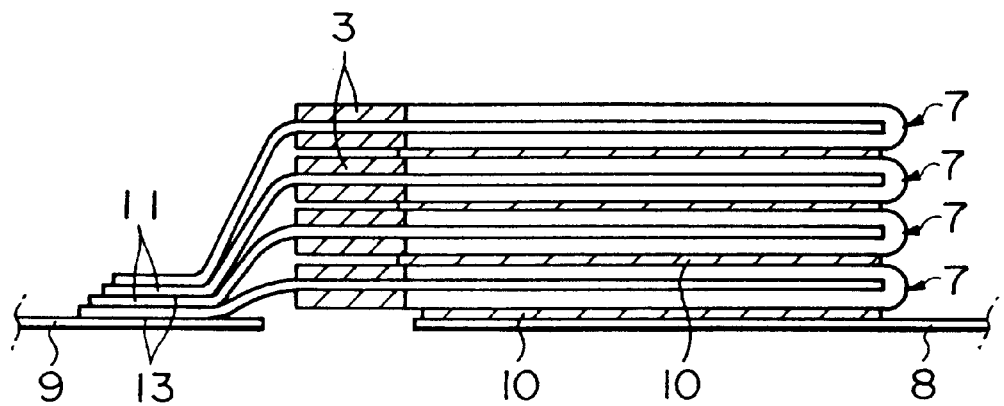
FIG. 7 is a cross-sectional view showing an example of a multilayer capacitor element of Comparative Example 1.

In the case of the stacked structure shown in FIG. 7, because respective cathode areas are stacked one on another in parallel, the anode areas 11 must be bent so as to allow the spot welding of these anode areas. As the number of stacked monolayer capacitor elements 7 increases, the anode area 11 of the uppermost stacked monolayer capacitor element 7 is bent at a greater angle, as shown in FIG. 7. As a result, the concentration of stress is generated in the vicinity of the boundary between the anode area 11 and the cathode area of the monolayer capacitor element 7, and thereby the capacitor performance deteriorates.

The present invention provides a multilayer solid electrolytic capacitor wherein the monolayer capacitor elements are stacked onto a lead frame in order to avoid to the utmost bending the anode areas of the monolayer capacitor elements 7 so as to prevent the concentration of stress from occurring during stacking of these elements on the lead frame.

Figure 4:
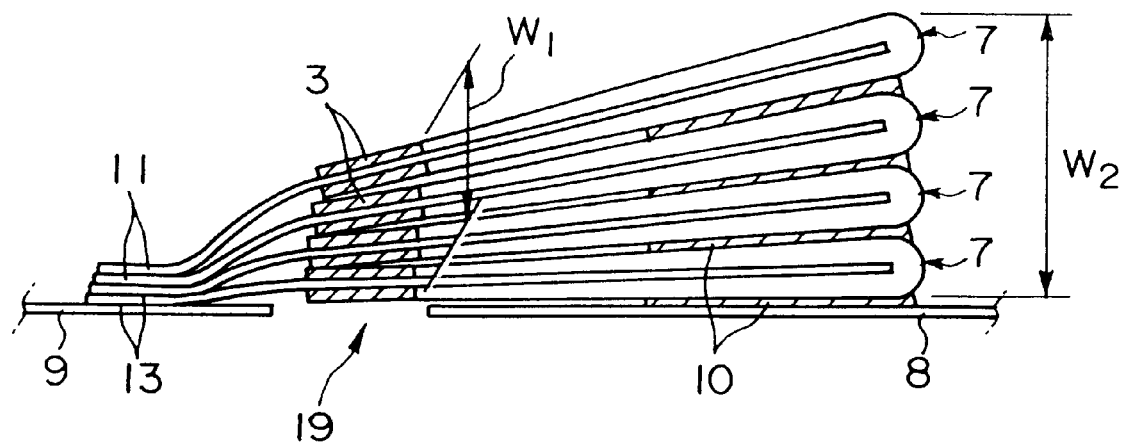
FIG. 4 is a cross-sectional view showing an example of a multilayer capacitor element according to the present invention.

More specifically, as shown in FIG. 4, in the multilayer capacitor elements 19, a plurality of anode parts 11 of monolayer capacitor elements 7 having the shape of an unfolded fan aligned in the same direction are stacked such that each anode area 11 comes close to the surface of the lead frame 9 in the anode side, and the thick cathode areas form an unfolded fan shape widening toward the cathode area side from the anode area 11 side.

If the monolayer capacitor elements 7 have the shape of an unfolded fan, when the anode areas 11 are stacked and bonded (stack-bonded) by spot welding or and the like, and respective cathode areas or a cathode area and the lead frame 8 in the cathode area side are stacked and bonded through an electrically conducting adhesive layer 10, a multilayer capacitor element 19 having a high yield and excellent heat resistance can be obtained.

The electrically conducting adhesive layer 10 can be formed using an electrically conducting paste such as silver paste containing silver micropowders.

A technique of placing two sheets of monolayer capacitor elements on a lead frame to form an unfolded fan shape is known (see Japanese Unexamined Patent Application, No. Hei 6-13269). However, the purpose of forming an unfolded fan shape is to mitigate the stress during curing of a resin on sealing with an armoring resin. Furthermore, this patent publication does not describe a technique of stacking and bonding the anode areas onto the surface of a lead frame, and thus substantially differs from the present invention.

In addition, in the present invention, as shown in FIG. 9, when the monolayer capacitor element 7 is stacked and bonded on the lead frame 8 in the cathode side by an electrically conducting paste, it is found advantageous to coat an appropriate amount of an electrically conducting paste on a specific region of each of the cathode area and the lead frame 8, because a large number of monolayer capacitor elements 7 are contained within an armoring resin 23 having a predetermined dimension. Furthermore, it is found that by stacking monolayer capacitor elements 7 under an appropriate pressure, a multilayer capacitor element 19 having an unfolded fan shape can be easily obtained.

Specifically, when using an electrically conductive paste, the applied pressure during stacking and bonding of the monolayer capacitor elements 7 on the lead frame 8 on the cathode side is preferably in the range of about 17–about 420 g/cm$^2$. Thus, when the monolayer capacitor elements 7 have a thickness of about 0.3 mm, a width of about 3 mm, and a length of about 4 mm, a load of about 2~about 50 g is applied during the stacking and bonding of the monolayer capacitors elements 7.

In addition, it has been found that by making the monolayer capacitor elements 7 have the shape of an unopened fan by adding a tapered gradient, as shown in FIG. 1, to the cathode area of the monolayer capacitor element 7, or by making the monolayer capacitor elements 7 have the the shape of an unopened fan by increasing the thickness of the cathode area of the monolayer capacitor elements 7, as shown in FIG. 2, the multilayer capacitor element 19 having the shape of an unopened fan can be obtained without difficulty.

The monolayer capacitor element for use in the manufacture of a solid electrolytic multilayer capacitor is described below.

Figure 3:
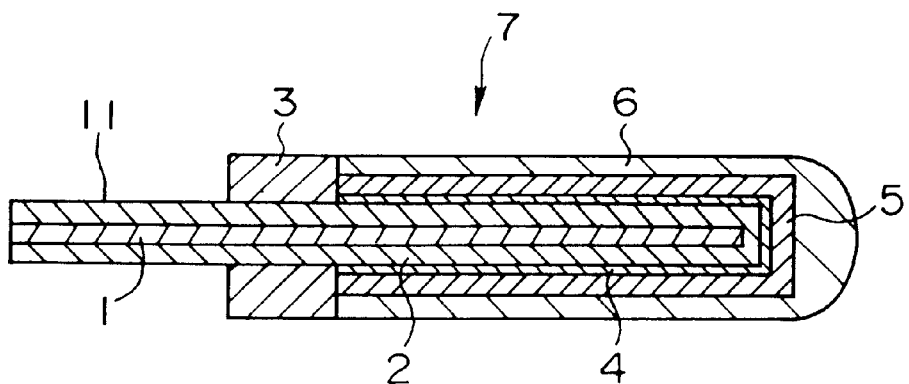
FIG. 3 is a cross-sectional view showing an example of a monolayer capacitor element.

As shown in FIGS. 1 to 3, in the monolayer capacitor element of the present invention, the edge of the cathode base 1 comprising the flat valve-acting metal having a dielectric oxide layer 2 on the surface is an anode area 11, and the solid electrolyte layer 4 on this dielectric oxide layer 2, excluding the part of the anode area 11, and the electrically conductive layers 5 and 6 sequentially formed thereon serve as the cathode area.

Here, the dielectric oxide layer 2 is formed on the finely porous surface comprising the valve-acting metal etched as the dielectric layer having a large surface area, and this dielectric oxide layer 2 can be formed with an oxide of the valve-acting metal such as alumina, tantalum oxide, and the like, or its sintered form. In the present invention, aluminum, tantalum, titanium, and the like, can be used as the valve-acting metal.

The anode base 1 denotes the supporting body of this valve-acting metal, and in the present invention, the end forming the dielectric oxide layer 2 on this surface is called the anode area 11.

In addition, before forming the dielectric oxide layer 2, etching processing is carried out to enlarge the surface area of the anode base 1 in order to increase its capacity.

As shown in FIGS. 1–3, the anode area and cathode area of the monolayer capacitor element is separated by the insulating layer 3, and the solid electrolytic layer 4 and the electrically conducting layers 5 and 6 are formed on the cathode area.

The insulating layer 3 may be provided in the form of a headband to divide the anode area 11 from the cathode area, while allowing the insulating layer to contact with the anode area 11. The insulating layer 3 is a layer for electrically insulating the cathode area from the anode area.

The insulating layer 3 is a material having insulating characteristics, and it is possible to use, for example, a typical thermoresistant resin, and preferably a thermoresistant resin that is soluble or can swell in solution or its precursor, or a composition comprising an inorganic micropowder and cellulose type resin (see Japanese Unexamined Patent Application, No. Hei 11-80596), and the like, can be used. However, the material is not particularly limited. Concrete examples are polyphenylsulfone (PPS), polyethersulfone (PES), cyanic acid ester resin, fluorocarbon resin (tetrafluoroethylene, tetrafluoroethylene perfluoroalkylvinylether copolymer, and the like), polyimides and their derivatives, and the like. Particularly preferable are polyimide, polyethersulfone, fluorocarbon resins and their precursors.

The above-mentioned polyimide is a compound comprising an imide group in the main chain, and is usually produced to convert the precursor into an imido-compound by heat processing at high temperatures after coating, using a solution in which the precursor, polyamic acid, is dissolved with a solvent. The material, as described above, is not limited to a chemical structure of the polyimide, but preferably is a compound with superior insulation characteristics having an average molecular weight of about 1,000 to about 1,000,000, and more preferably, from about 2,000 to about 200,000.

The solid electrolyte layer 4 may be formed by a chemical oxidation or electrolytic oxidation method using an organic material that comprises an electrically conducting polymer or tetracyanoquinodimethane (TCNQ), and the like, or an inorganic material including a metal oxide such as manganese dioxide or lead dioxide.

The electrically conducting layer 5 on the solid electrolyte layer 4 may be formed with a carbon paste and the electrically conducting layer 6 on the electrically conducting layer 5 may be formed with an electrically conducting paste such as silver paste and the like, respectively, however, the present invention is by no means limited to these materials or methods.

Examples of the electrically conducting polymer which can be used in the present invention for forming the solid electrolyte layer 4 include polymers such as an intrinsic conducting polymer (described, for example, in Japanese Unexamined Patent Application, No. Hei 1-169914), π-conjugated polyaniline (described, for example, in Japanese Unexamined Patent Application, No. Hei 61-239617), polypyrrole of a 5-membered heterocyclic compound (described, for example, in Japanese Unexamined Patent Application, No. Hei 61-240625), polythiophene derivatives (described, for example, in Japanese Unexamined Patent Application, No. Hei 2-15611) and polyisothianaphthene (described, for example, in Japanese Unexamined Patent Application, No. Hei 62-118511).

That is, in order to form the solid electrolyte layer 4, it is possible to use a conductive polymer comprising at least one chemical structure selected from the group consisting of a divalent chemical structure of aniline, pyrrole, thiophene, isothianaphthene, and substituted derivatives thereof. In addition, it is possible to use polymers including the well-known conductive polymers, that is, the polymer comprising a divalent chemical structure of benzene, p-phenylenevinylene, thienylene vinylene, naphtho[2,3-c]thiophene, or substituted derivatives thereof.

In the case when a polymer of a polymerizable 5-membered heterocyclic compound (referred to hereinbelow as a "5-membered heterocyclic compound") such as pyrrole or thiophene is used, a method of immersing an anode foil in a lower alcohol/water-type solution of a 5-membered heterocyclic compound and then immersing the foil in an aqueous solution having dissolved therein an oxidizing agent and an electrolyte to effect chemical polymerization and thereby form an electrically conducting polymer on the anode foil (see Japanese Unexamined Patent Application, No. Hei 5-175082), or a method of separately sequentially or simultaneously coating a 3,4-dioxyethylene-thiophene monomer and an oxidizing agent preferably each in the form of a solution on the dielectric oxide film of a metal foil (see, Japanese Unexamined Patent Application, No. Hei 2-15611 and Japanese Unexamined Patent Application, No. Hei 10-32145) may be used in the present invention. Furthermore, as disclosed in Japanese Unexamined Patent Application, No. Hei 10-32145, a poly(3,4-dioxyethylene-thiophene) doped with a specific organic sulfonic acid such as benzo-quinonesulfonic acid or alicyclic sulfonic acid may also be used in the present invention.

Furthermore, in the monolayer capacitor element and the multilayer solid electrolytic capacitor of the present invention, on the solid electrolyte 4, a polymer of a 3,4-dioxyethylene-thiophene derivative shown in the general formula (I) below can be favorably used.

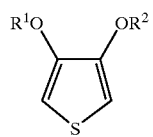

(I)

In the general formula (I), the substituents $R^1$ and $R^2$ each independently denotes a hydrogen atom, a linear or branched, saturated or unsaturated $C_1$–$C_6$ alkyl, or a substituent group which may be combined to each other at any position to form at least one or more 5-, 6- or 7-membered saturated ring structures including two oxygen elements.

In addition, in the same manner, a polymer comprising a divalent chemical structure in general formula (II) shown below also can be used favorably in order to form the solid electrolyte 4.

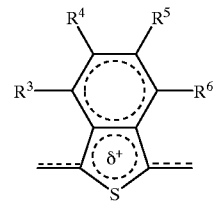

(II)

In the above general formula (II), $R^3$, $R^4$, $R^5$, and $R^6$ each independently denotes a monovalent group selected from a group consisting of hydrogen atoms, a straight or branched, saturated or unsaturated alkyl group, alkoxy group or alkyl ester group having $C_1$–$C_{10}$ carbon atoms, a halogen atom, nitro group, cyano group, a primary, secondary or tertiary amino group, a trifluoromethyl group, a phenyl group or substituted phenyl group. In addition, the alkyl chains of $R^3$, $R^4$, $R^5$, and $R^6$ may be linked together at arbitrary positions and may be a divalent group to form at least one 3-, 4-, 5-, 6-, or 7-membered saturated or unsaturated ring structures including carbon atoms subject to substitutions by the substituents.

In addition, in general formula (II), on the alkyl groups, alkoxy groups. alkyl ester group denoted by $R^3$, $R^4$, $R^5$, $R^6$ and the cyclic hydrocarbon chains formed by combinations thereof, it is possible to include an arbitrary number of carbonyl, ether, ester, amide, sulfide, sulfinyl, sulfonyl, or imino bonds. The δ in general formula (II) denotes the charge number per repeating unit, and has a range of 0~1.

However, in the monolayer capacitor elements and the multilayer solid electrolytic capacitors of the present invention, the chemical structure is not limited in particular, and it will be satisfactory if the electrical conductivity of the material forming the solid electrolyte 4 is usually in the range of about 0.1~about 200 S/cm, preferably in a range of about 1~about 100 S/cm, and more preferably in a range of about 10~about 100 S/cm.

Examples of the oxidizing agent suitably used for the oxidative polymerization of a 5-membered heterocyclic compound such as pyrroles and thiophenes include iron(III) chloride, $Fe(ClO_4)_3$, organic acid iron(III), inorganic acid iron(III), alkyl persulfates, ammonium persulfates and hydrogen peroxides over a wide range. Examples of the organic acid for the organic acid iron(III) include an alkyl-sulfonic acid having from 1 to 20 carbon atoms, such as methanesulfonic acid and dodecylbenzenesulfonic acid, and an aliphatic carboxylic acid having from 1 to 20 carbon atoms. The use range of the oxidizing agent is sometimes limited depending on the chemical structure of the monomer compound, the oxidizing agent used, and the reaction conditions. For example, according to Handbook of Conducting Polymers, page 99, FIG. 5, Marcel Dekker, Inc. (1987), the oxidation potential (one of indices for showing ready occurrence of polymerization) in the oxidization (polymerization) of a thiophene greatly varies depending on the kind of the substituent governing the polymerization reaction (the oxidation potential extends over a range of from about 1.8 to about 2.7 V). Accordingly, the combination of a monomer compound, an oxidizing agent, and the reaction conditions is very important.

The dopant included in this electrically conducting polymer is not limited to a used polymer having a π-electron conjugated structure. It is sufficient if the dopant is a normal anion, or that this anion is an anion of a low molecular weight molecule or a polymer anion such as a polyelectrolyte and the like. For example, specifically, it is possible to use a halogenized compound anion comprizing an element in the 5B group such as $PF_6^-$, $SbF_6^-$, or $AsF_6^-$, a halogenized compound anion comprising an element in the 3B group such as $BF_4^-$, a halogen anion such as $I^-$ $(I_3^-)$, $Br^-$, $Cl^-$, a perhalogenous acid anion such as $ClO_4^-$, a Lewis acid anion such as $AlCl_4^-$, $FeCl_4^-$, or $SnCl_5^-$, an inorganic acid anion such as $NO_3^-$ or $SO_4^{2-}$, or an anion of organic sulfonic acid such as a p-toluenesulfonic acid or a naphthalenesulfonic acid, a $C_1$~$C_5$ alkyl substituted naphthalenesulfonic acid, $CF_3SO_3^-$ or $CH_3SO_3^-$, or a proton acid anion of a carboxylic acid such as $CH_3COO^-$ or $C_6H_5COO^-$.

Furthermore, preferably, organic sulfonic acid anion or an organic phosphoric acid anion can be used. In particular, among organic sulfonic acid anions, it is possible to use various compounds such as aromatic sulfonic acid anions, aromatic polysulfonic acid anions, organic sulfonic acid anions having a substituent of an OH group or a carboxy group and an aliphatic organic sulfonic acid anion having a skeleton such as adamantane.

Examples of organic sulfonic acid are benzenesulphonic acid and p-toluenesulfonic acid, methanesulfonic acid. ethanesulfonic acid, α-sulfo-naphthalene, β-sulphonaphthalene, naphthalenedisulfonic acid, alkylnaphthalenesulfonic acid (using a butyl, triisopropyl, di-t-butyl, and the like, as the alkyl group).

In addition, other examples are the anions of a sulfoquinone compound having one or more sulfo-anion groups and quinone structure (referred to hereinbelow as a "sulfoquinone anion"), an anthracenesulfonic acid anion, a naphthalenesulfonic acid anion, a benzenesulfonic acid anion, and a (o, p, m) xylilenedisulfonic acid anion.

Examples of a basic skeleton of the sulfoquinone anion are p-benzoquinone, o-benzoquinone, 1,2-naphthoquinone, 1,4-naphthoquinone, 2,6-naphthoquinone, 9,10-anthraquinone, 1,4-anthraquinone, 1,2-anthraquinone, 1,4-chrysenequinone, 5,6-chrysenequinone, 6,12-chrysenequinone, acenaphthoquinone, acenaphthenequinone, camphorquinone, 2,3-bornanedione, 9,10-phenanthrenequinone, and 2,7-pyrenequinone.

Among these, the sulfoquinones that can be preferably used in the present invention are sulfoquinones having a skeleton of anthraquinone, 1,4-naphthoquinone, and 2,6-naphthoquinone. Examples of the anthraquinone type that can be used are anthraquinone-1-sulfonic acid, anthraquinone-2-sulfonic acid, anthraquinone-1,5-disulfonic acid, anthraquinone-1,4-disulfonic acid, anthraquinone-1,3-disulfonic acid, anthraquinone-1,6-disulfonic acid, anthraquinone-1,7-disulfonic acid, anthraquinone-1,8-disulfonic acid, anthraquinone-2,6-disulfonic acid, anthraquinone-2,3-disulfonic acid, anthraquinone-2,7-disulfonic acid, anthraquinone-1,4,5-trisulfonic acid, anthraquinone-2,3,6,7-tetrasulfonic acid, the alkali metal salts thereof, and the ammonium salts thereof.

For 1,4-naphthoquinone, it is possible to use 1,4-naphthoquinone-5-sulfonic acid, 1,4-naphthoquinone-6-sulfonic acid, 1,4-naphthoquinone-5,7-disulfonic acid, 1,4-naphthoquinone-5,8-disulfonic acid, the alkali metal salts thereof, and the ammonium salts thereo.

For 2,6-naphthoquinone, it is possible to use 2,6-naphthoquinone-1-sulfonic acid, 2,6-naphthoquinone-3-sulfonic acid, 2,6-naphthoquinone-4-sulfonic acid, 2,6-naphthoquinone-3,7-disulfonic acid, 2,6-naphthoquinone-4,8-disulfonic acid, the alkali metal salts thereof, and the ammonium salts thereof.

In addition, for the above sulfoquinone, for example, anthraquinone irisR and anthraquinone violet RN-3RN are selected from the industrial dyes and it is possible to use the forms of the above salts as the useful sulfoquinone-type dopant in the same manner as those.

Furthermore, polyelectrolyte anions such as polyacrylic acid, polymethacrylic acid, polystyrenesulfonic acid, polyvinylsulfonic acid, polyvinylsulfate, poly-α-methylsulfonic acid, polyethylenesulfonic acid, and polyphosporic acid are used.

In addition, the dopants also include reductant anions of well-known oxidizing agents that can produce the electrically conducting polymer. This includes, for example, a sulfate anion which is a produced anion from an oxidizing agent such as persulfate alkali metal salt or ammonium persulfate. Besides these, there are dopants produced from manganese such as potassium permanganate or quinones such as 2,3-dichloro-5,6-dicyano-1,4-benzoquinone (DDQ), tetrachloro-1,4-benzoquinone, and tetracyano-1,4-benzoquinone.

Above, in the present invention, preferably a compound is used that includes at least a species among the above dopants is used to comprise with the conductive polymer. For example, sulfate ions as the dopant of the electrically conducting polymer is comprised in a range of about 0.1~about 10 mol % per the total repeating units of the π-conjugated structure and the above sulfoquinone ions as another dopant, for example, anthraquinonesulfonic acid anions is comprised in a range of about 1~about 50 mol %.

The following is further explanation of the monolayer capacitor elements.

When a monolayer capacitor element used has a clavate form such that the thickness at the distal end part of the cathode area is larger than the thickness at the base part of the cathode area as shown in FIGS. 1 and 2, if it is stacked as a multilayer solid electrolyte capacitor, the multilayer capacitor element 19 can be easily formed into an unfolded fan shape (see FIG. 9). In other words, the monolayer capacitor element 7 preferably has a shape such that the total thickness of the solid electrolyte layer 4 and the electrically conducting layers 5 and 6 gradually increases toward the distal end of the cathode area as shown in FIG. 1 or a shape such that the total thickness increases stepwise toward the distal end of the cathode area as shown in FIG. 2.

Furthermore, as another embodiment of the invention, in the clavate-shaped monolayer capacitor element, the clavate form preferably satisfies the condition that the ratio $S_2/S_1$ of the maximum thickness $S_2$ at the distal end part to the thickness $S_1$ of the base part of the cathode area is within a range of about 1.1 to about 5.0, more preferably within a range of about 1.3 to about 3.0.

Examples of the method for obtaining a monolayer capacitor element 7 having a shape shown in FIG. 1 include a method of coating respective electrically conducting pastes and mechanically pressure-molding the coating so that the electrically conducting layers 5 and 6 in the distal end side can have a larger total thickness. Also, a method of repeatedly coating an electrically conducting paste on the distal end part of the element 7 to gradually or stepwise increase the total thickness of the electric conductors 5 and 6 as shown in FIGS. 1 or 2 may be used. As far as the distal end part of the element 7 can have a thickness larger than the thickness $S_1$ at the base part of the cathode area, any method may be used.

The monolayer capacitor elements 7 are stacked to form a multilayer capacitor element 19, as shown in FIG. 4, for example.

Figure 6:
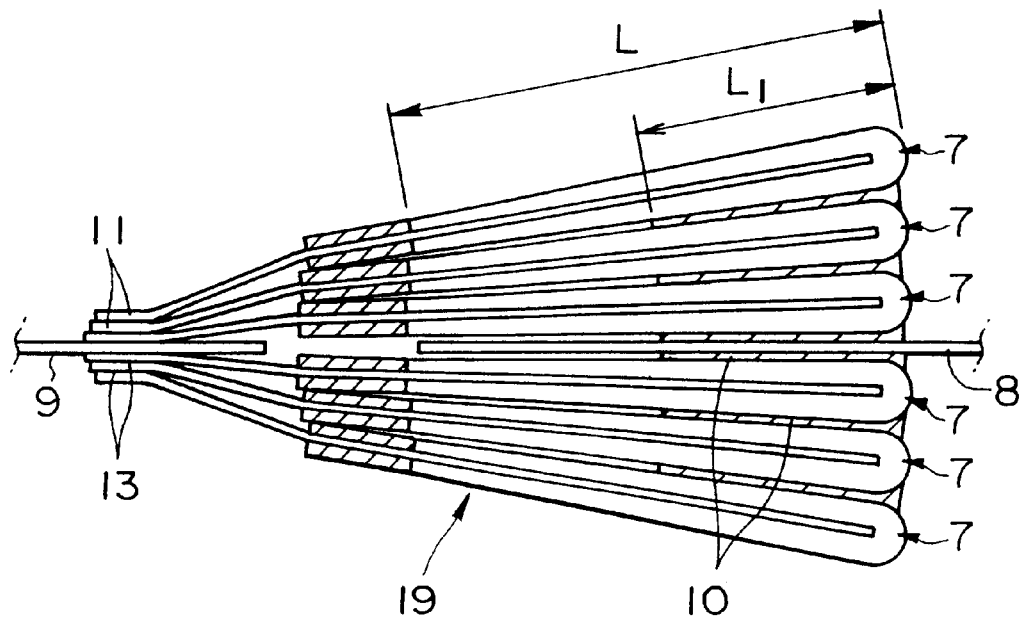
FIG. 6 is a cross-sectional view showing an example of a multilayer capacitor element obtained by stacking monolayer capacitors on both side of a lead frame.

The monolayer capacitor elements 7 may be stacked by a method of being stacked one by one on the lead frame 8 in the cathode side using an electrically conducting paste or a method of previously stacking two or more monolayer capacitor elements so as to have an unfolded fan shape and bonding the stack onto the lead frame 8 in the cathode side. Also, a set of elements 7 may be stacked. A stacking method other than these may also be used. Furthermore, the monolayer capacitor elements 7 may be stacked, as shown in FIG. 6, both on the front and back surfaces of the lead frame 8.

In order to obtain a multilayer capacitor element 19 having an unfolded fan shape using a non-clavate monolayer capacitor element (FIG. 3) where the upper and lower surfaces run almost parallel to each other, a method of making the thickness of the electrically conducting adhesive layer 10 at the distal end part of the cathode area larger than at the base part of the cathode area may be used.

The electrically conducting adhesive layer 10 between one cathode area and another cathode layer and the electrically conducting adhesive layer 10 between a cathode area and the lead frame 8 in the cathode side each is preferably formed in the range of 80% or less of the cathode length L (see FIG. 1) from the distal end of the cathode area (that is, the length $L_1$ of the electrically conducting adhesive layer 10 from the distal end of the cathode area is 0.8×L or less). If the electrically conducting adhesive layer 10 is formed in the range exceeding 80% from the distal end, the electrically conducting paste may reach the anode area 11 at the time of stacking and the yield may decrease due to occurrence of a short circuit or and the like, or even if short circuit does not occur, the performance may deteriorate, for example, and the leakage current may increase. For forming the electrically conducting adhesive layer 10 within the range of 80% or less of the length L of the cathode area, the electrically conducting paste is preferably coated in the range of half the length of the cathode area from the distal end side.

Figure 5:
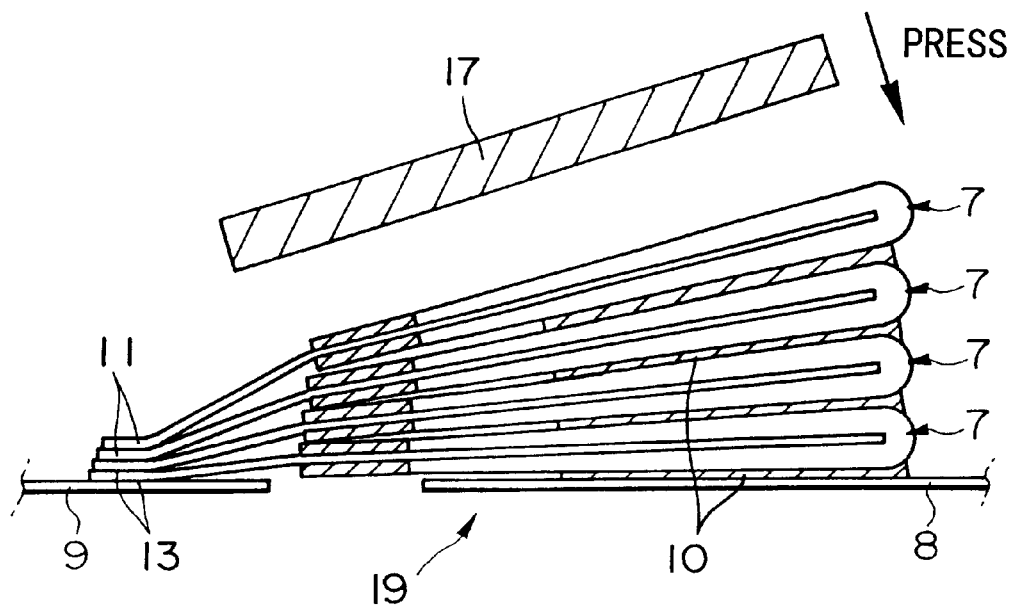
FIG. 5 is a cross-sectional view showing another example of pressing stacked monolayer capacitors when manufacturing a multilayer capacitor of the present invention.

A plurality of monolayer capacitor elements 7 is preferably stacked while mechanically applying a pressure thereto to provide a multilayer capacitor element 19 having an unfolded fan shape. More specifically, as shown in FIG. 5, a plurality of monolayer capacitor elements 7 are stacked on a lead frame 8 in the cathode side through an electrically conducting paste while applying an appropriate pressure to the monolayer capacitor elements 7 by means of a pressurizing plate 17, so that the thickness of the electrically conducting paste can be controlled and an unfolded fan shape having a predetermined dimension can be formed.

In this case, if the thickness of the electrically conducting adhesive layer 10 is made gradually larger from the base part of the cathode area towards the distal end part of the cathode area, the thickness $W_2$ of the distal end of the cathode area of the multilayer capacitor element 19 becomes larger than the thickness $W_1$ of the base part of the cathode area, and as a result, the multilayer capacitor element 19 easily takes on the shape of an unopened fan.

The unfolded fan shape of the multilayer capacitor element 19 satisfies the condition that the ratio $W_2/W_1$ of the maximum thickness $W_2$ at the distal end part of the cathode area of the element 19 to the thickness $W_1$ at the base part of the cathode area of the multilayer capacitor element 19 is from about 1.3 to about 5.5, and preferably from about 1.5 to about 3.5.

The anode areas 11 of the monolayer capacitor elements 7 may be bent after the monolayer capacitor elements 7 are stacked or may be bent prior to the stacking.

One anode area 11 and another anode area 11 or an anode area 11 and the lead frame 9 in the anode side may be connected by spot welding, laser welding, or bonding through an electrically conducting paste. The order between the stacking of the cathode areas and the connection of the anode areas is not particularly limited and either may be performed in advance or these may be performed alternately. In any case, in the manufacture of a multilayer capacitor element 19, it is important to stack monolayer capacitor elements 7, while taking care not to impose a large mechanical stress thereon.

The multilayer capacitor element 19 is, as shown in FIG. 9, sealed with an armoring resin 23, and the lead frame outside the armoring resin 23 is bent to conform to the armoring resin working out to an outside lead 21, thereby manufacturing a solid electrolytic multilayer capacitor 25. Examples of the armoring resin 23 include an epoxy resin and a phenolic resin. The outside lead 21 is constructed with the material, for example, alloys-42.

When the monolayer capacitor elements 7 are stacked and bonded onto the lead frame 9 on the anode side after aligning the anode areas in the same direction, or when a monolayer capacitor element 7 having a clavate shape is used, the multilayer capacitor element 19 can be prevented from protruding outside the armoring resin 23 and moreover, the number of monolayer capacitor elements 7 stacked can be increased to obtain a high-capacity solid multilayer capacitor 25.

The yield and the heat resistance of the multilayer capacitor element are described below by referring to structural examples.

FIG. 4 is a cross-sectional view showing one example of a multilayer capacitor element, where four sheets of monolayer capacitor elements 7 are stacked so as to have an unfolded fan shape without applying pressure thereto, so that the anode areas 11 can be spot-welded without greatly bending the anode areas. This example exhibits a good yield and a reduced leakage current after the reflow test as compared with the example of FIG. 7, which is described below.

FIG. 5 is a cross-sectional view showing one example of a multilayer capacitor element, where monolayer capacitor elements 7 are stacked while mechanically applying a pressure thereto at a predetermined angle every capacitor 7 sheet to control the space between monolayer capacitor elements 7, thereby obtaining an objective multilayer capacitor element having an unfolded fan shape. As a result, the cathode areas 11 of the monolayer capacitor elements 7 can be spot-welded even if the areas are not greatly bent. Similarly to the example shown in FIG. 4, the yield is good and the leakage current after the reflow test is small.

FIG. 6 shows an example of a multilayer capacitor element obtained by stacking three monolayer capacitor elements 7 on each of the front and back surfaces of a lead frame 8. The yield and the leakage current after the reflow test both are slightly inferior to the example of stacking four elements shown in FIG. 5, and this seems to be ascribable to the fact that six sheets of elements are stacked. However, this example is superior to the example of FIG. 7 described below.

FIG. 7 shows an example of a multilayer capacitor element obtained by stacking four monolayer capacitor elements 7 to run parallel to each other. The elements 7 are stacked such that the cathode side runs parallel to a lead frame 8, and in order to bring the anode area 11 of each tabular substrate close to a lead frame 9 and facilitate the spot welding, the anode areas 11 must be greatly bent. Accordingly, the yield is bad as compared with the multilayer capacitor elements of FIGS. 4 to 6, where the stress generated at the boundary between the insulating area and the cathode area is small. Furthermore, the leakage current after the reflow test is large.

Figure 8:
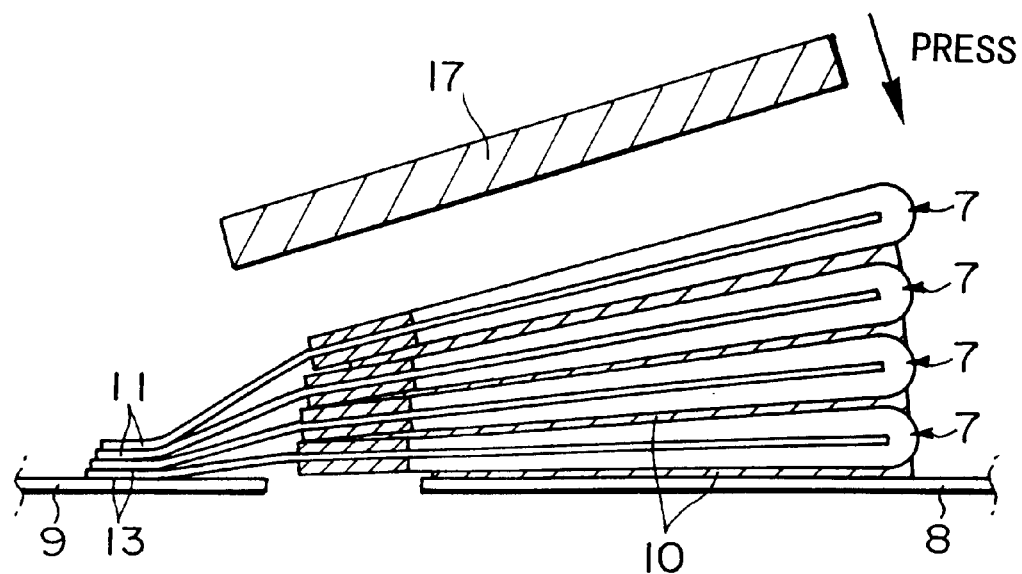
FIG. 8 is a cross-sectional view showing an example of pressing stacked monolayer capacitors when manufacturing a multilayer capacitor of Comparative Example 2.

FIG. 8 shows an example of a multilayer capacitor element obtained by coating an electrically conducting past throughout the surface of each cathode area at the time of stacking elements 7 while applying a pressure thereto. When an electrically conducting paste is present on the cathode area in the vicinity of the boundary with the insulating area, the leakage current increases. As compared with the example shown in FIG. 5, the yield and the current leakage after the reflow test both are rather bad.

EXAMPLES

Multilayer capacitor elements shown in FIGS. 4 to 8 were manufactured and compared with respect to the yield and the heat resistance.

Example 1

The multilayer capacitor element of this Example is shown in FIG. 4

A claviform-shaped monolayer capacitor element 7 shown in FIG. 1 was manufactured as follows.

An area having a size of 2-mm in length and 3-mm in width on the upper end of an aluminum (valve-acting metal) etching foil (anode base 1) having a size of 90-$\mu$m in thickness, 5-mm in length and 3-mm in width, and having formed on the surface thereof an alumina dielectric oxide film 2 was used as a cathode area 11. The remaining area having a size of 3 mm×3 mm was subjected to forming treatment at 13 V in a 10 wt % aqueous ammonium adipate solution to form a dielectric oxide layer 2 at the cut end part, thereby preparing the dielectrics. The surface of this dielectric material was impregnated with an aqueous solution adjusted to contain 20 wt % of ammonium persulfate and 0.1 wt % sodium anthraquinone-2-sulfonate. Thereafter, the substrate with the dielectrics was dipped in a 1.2 mol/l isopropanol solution having dissolved therein 5 g of 3,4-dioxyethylene-thiophene. This substrate was taken out, left standing in an environment of 60° C. for 10 minutes to complete the oxidative polymerization, and then washed with water. This polymerization reaction and the water washing were each repeated 10 times to form a solid electrolyte layer 4 comprising an electrically conducting polymer.

Thereafter, the substrate was dipped in a carbon paste tank and the carbon paste was solidified to form an electrically conducting layer 5. Then, the substrate was dipped in a silver paste tank and the silver paste was solidified to form an electrically conducting layer 6. This dipping operation was repeated so that the electrically conducting layer 6 could have a thickness gradually increasing toward the distal end. Thus, a calviform-shaped monolayer capacitor element 7 shown in FIG. 1 was obtained. The ratio $S_2/S_1$ of the maximum thickness $S_2$ at the distal end to the thickness $S_1$ at the base part of the cathode area of the monolayer capacitor element 7 was 2.1.

As shown in FIG. 4, four sheets of the monolayer capacitor elements 7 were stacked and bonded while aligning four anode areas 11 toward the left side and four cathode areas toward the right side, by bonding one cathode area to another cathode area or a cathode area to a lead frame 8 with an electrically conducting paste, to obtain a stacking having an unfolded fan shape. Respective anode areas 11 or one surface of a lead frame 9 and the lower surface of an anode area 11 were spot-welded to each other while bending the anode areas 11 of the stacking to obtain a multilayer capacitor element 19 shown in FIG. 4. In FIG. 4, the numeral 13 denotes the welded area. At this time, four monolayer capacitor elements 7 were stacked without applying pressure thereto and the length of the electrically conducting paste coated was 50% of the cathode area length L from the distal end.

Example 2

The multilayer capacitor element of this Example is shown in FIG. 5. Example 2 differs from Example 1 mainly in that four monolayer capacitor elements 7 were pressurized (40 g/element) using a pressurizing plate 17 at the time of manufacturing the multilayer capacitor element 19.

Example 3

The multilayer capacitor element 19 of this Example is shown in FIG. 6. Example 3 differs from Example 2 mainly in that three monolayer capacitor elements 7 were stacked on each of the front and back surfaces of the lead frame 8.

Comparative Example 1 and Comparative Example 2

The multilayer capacitor element of Comparative Example 1 is shown in FIG. 7. Comparative Example 1 differs from Example 1 mainly in that the monolayer capacitor elements 7 were stacked such that the cathode side thereof runs parallel to the lead frame 8 during the manufacturing the multilayer capacitor element 19 .

The multilayer capacitor element of Comparative Example 2 is shown in FIG. 8. Comparative Example 2 differs from Example 1 mainly in that the electrically conducting paste was coated throughout the surface of the cathode area and then respective monolayer capacitor elements 7 or a monolayer capacitor element 7 and the lead frame 8 in the cathode side were stacked one on another.

The yield and the leakage current after the reflow test of each of the multilayer capacitor elements thus obtained are shown in Table 1. It is seen from Table 1 that the multilayer capacitor elements of Examples 1 to 3 were good in the yield and low in the leakage current after the reflow test as compared with Comparative Examples 1 and 2.

TABLE 1

| | Stacked State (number of elements stacked) | Coating of Paste (Note 1) | Pressurization | Yield (%) (Note 2) | Leakage Current after Reflow Test (Note 3) | |
|---|---|---|---|---|---|---|
| | | | | | Average (μA) | Range (μA) |
| Example 1 | unfolded fan shape (4 sheets) | a half in the distal end side | none | 86 | 0.3 | 0.5 |
| Example 2 | unfolded fan shape (4 sheets) | a half in the distal end side | pressurized | 93 | 0.3 | 0.4 |
| Example 3 | unfolded fan shape (6 sheets) | a half in the distal end side | pressurized | 80 | 0.4 | 0.5 |
| Comparative Example 1 | parallel (4 sheets) | throughout the surface | none | 71 | 1.7 | 2.5 |
| Comparative Example 2 | unfolded fan shape (4 sheets) | throughout the surface | pressurized | 78 | 0.7 | 1.0 |

Notes
(1) Area of the electrically conducting paste for adhesion coated on the cathode area
(2) The yield was calculated by judging those having a leakage current of 1 μA or less acceptable.
(3) The average and the variation of the leakage current after the heat treatment (peak: 240° C.) in a reflow furnace were evaluated (n = 30).
(4) The range shown in Table 1 shows the difference between the maximum current value and the minimum current value With respect to the multilayer capacitor element shown in FIG. 4, the solid electrolyte was changed to another electrically conducting polymer or inorganic oxide during the manufacture of the multilayer capacitor element. The yield and the heat resistance thereof were compared as follows.

Example 4

The dielectrics were prepared in the same manner as in Example 1. The surface of this dielectrics were dipped in a deaerated IPA solution (Solution 4) of 5,6-dimethoxy-isothianaphthene having a concentration 1.2 mol/l, which was synthesized and sublimation produced according to the method described in Japanese Unexamined Patent Application, No. Hei 2-242816, and then impregnated with an aqueous solution (Solution 3) prepared by dissolving sodium 3-methyl-2-anthraquinolylmethanesulfonate synthesized by the method described in Tetrahedron, Vol. 35 (No. 19), page 2263 (1979), into an aqueous ammonium persulfate solution having a concentration of 20 wt % to have a concentration of the compound of 0.1 wt %. Thereafter, the substrate was removed and left standing in an environment at 60° C. for 10 minutes to complete the oxidative polymerization. These dipping operations were each repeated 10 times to form a solid electrolyte layer 4 comprising an electrically conducting polymer. Subsequently, the electrically conducting layers 5 and 6 were formed and four sheets of the monolayer capacitor elements 7 were stacked and bonded to the lead frames 8 and 9 to obtain a multilayer capacitor element shown in FIG. 4. That is, a multilayer capacitor element was manufactured in the same manner as in Example 1 except for the formation of the solid electrolyte layer 4.

Example 5

A multilayer capacitor element was manufactured by stacking four sheets of monolayer capacitor elements 7 in the same manner as in Example 1, except for using a pyrrole-N-methyl solution having the same concentration in place of 3,4-dioxyethylene-thiophene used in Example 1.

Example 6

The dielectrics were prepared in the same manner as in Example 1. The surface of this dielectrics were dipped in a mixed solution of an aqueous solution containing 2.4 mol/l of lead acetate trihydrate and an aqueous solution containing 4.0 mol/l of ammonium persulfate, and then allowed to react at 60° C. for 30 minutes. This reaction was repeated 3 times to form a solid electrolyte layer 4 comprising 25 wt % of lead dioxide and 75 wt % of lead sulfate. Subsequently, four sheets of the monolayer capacitor elements 7 were stacked in the same manner as in Example 1 to manufacture a multilayer capacitor element.

The yield and the leakage current after the reflow test of each of the multilayer capacitor elements of Examples 4 to 6 are shown in Table 2. It is seen that the same results were obtained as in Example 1 with respect to both the yield and the heat resistance in either the case of using an electrically conducting polymer or an inorganic oxide as the solid electrolyte and that a multilayer capacitor element having good properties could be obtained no matter which of these solid electrolytes was used.

However, more preferred results were obtained when an electrically conducting polymer was used as the solid electrolyte, and this seems to be ascribable to the fact that the electrically conducting polymer is slightly superior to the inorganic oxide in the initial value and variation of the leakage current after the reflow test and further has excellent flexibility.

TABLE 2

| | | Yield | Leakage Current after Reflow Test (Note 6) | |
|---|---|---|---|---|
| | Material for Producing A Solid Electrolyte Layer | (%) (Note 5) | Average (μA) | Range (μA) |
| Example 4 | 5,6-dimethoxy-isothianaphthene | 93 | 0.3 | 0.4 |
| Example 5 | pyrrole-N-methyl | 92 | 0.3 | 0.5 |
| Example 6 | lead acetate trihydrate | 91 | 0.5 | 0.7 |

Note
(5) The yield was calculated by judging those having a leakage current of 1 μA or less acceptable.
(6) The average and the variation of the leakage current after the heat treatment (peak: 240° C.) in a reflow furnace were evaluated (n = 30).
(7) The range shown in Table 2 shows the difference between the maximum current value and the minimum current value.

As described in the foregoing, according to the present invention, a multilayer capacitor element excellent in yield and heat resistance can be obtained and in turn, a high-capacity solid electrolytic multilayer capacitor excellent in yield and heat resistance can be obtained. This solid electrolytic multilayer capacitor can be easily obtained by using the monolayer capacitor element of the present invention. The multilayer solid electrolyte capacitor of the present invention can be used as a capacitor in electronic devices, and the like.

What is claimed is:

1. A monolayer capacitor element comprising an anode area allocated to an end part of an anode substrate comprising a tabular valve-acting metal having a dielectric oxide layer formed on the surface thereof, and a cathode area formed by sequentially providing a solid electrolyte layer on said dielectric oxide layer exclusive of said anode area and thereon an electrically conducting layer, the thickness at the distal end part of said cathode area being larger than the thickness at the base part of the cathode area.

2. A solid electrolytic multilayer capacitor comprising a multilayers capacitor element obtained by stacking a plurality of monolayer capacitor elements each comprising an anode area allocated to an end part of an anode substrate comprising a tabular valve-acting metal having formed on the surface thereof a dielectric oxide layer, and a cathode area formed by sequentially providing a solid electrolyte layer on said dielectric oxide layer exclusive of said anode area and thereon an electrically conducting layer, such that the anode areas aligned in the same direction are stacked and bonded onto a lead frame in the anode side and the cathode areas are stacked and bonded by forming an electrically conducting adhesive layer on a lead frame in the cathode side so as to have an unfolded fan shape widening from the anode area side toward the distal end of the cathode area, with the periphery of the multilayer capacitor element being covered and sealed with an armoring resin.

3. The solid electrolytic multilayer capacitor according to claim 2, wherein the monolayer capacitor element used is a monolayer capacitor element in which the thickness at the distal end of the cathode area is larger than the thickness at the base part of the cathode area.

4. The solid electrolytic multilayer capacitor according to claims 2 or 3, wherein the electrically conducting adhesive layer is formed in the range of about 80% or less of the cathode area length from the distal end of the cathode area.

5. The solid electrolytic multilayer capacitor according to claim 2, wherein the multilayer capacitor element is obtained by stacking under pressure a plurality of monolayer capacitor elements.

6. The solid electrolytic multilayer capacitor according to claims 2 or 3, wherein one cathode area and another cathode area of the monolayer capacitor elements in plurality or a cathode area and the lead frame in the cathode side are stacked and bonded through an electrically conducting adhesive layer and the thickness of the electrically conducting adhesive layer at the distal end part of the cathode is larger than that at the base part of the cathode area.

7. The solid electrolytic multilayer capacitor according to claims 2 and 3, wherein the solid electrolyte layer is formed by using an electrically conducting polymer.

8. The solid electrolytic multilayer capacitor according to claim 7, wherein the electrically conducting polymer is a polymer comprising at least a chemical structure selected from the group consisting of a divalent chemical structure of a 5-membered polymerizable heterocyclic compound, aniline, benzene, p-phenylenevinylene, thienylenevinylene, isothianaphthene, naphtho[2,3-c]thiophene and the substituted derivatives thereof.

9. The solid electrolytic multilayer capacitor according to claim 8, wherein the 5-membered polymerizable heterocyclic compound is 3,4-dioxyethylene-thiophene or the substituted derivative thereof.

10. The solid electrolytic multilayer capacitor according to claims 2 or 3, wherein the number of the monolayer capacitor elements is in a range of 2~about 20.

11. The solid electrolytic multilayer capacitor according to claims 2 or 3, wherein the means for stacking and bonding the anode areas aligned in the same direction on the anode side lead frame is to be spot-welded.

12. The monolayer capacitor element according to claim 1, wherein the ratio of the thicknesses of the base part of the cathode area and the distal end of the cathode area is in the range of about 1.1~about 5.0.

13. The monolayer capacitor element according to claims 1 or 12, wherein a gradient in the shape of an unopened fan is applied to the thickness of the cathode area, or the thickness of the cathode area is increased stepwise, and the thickness of the distal end of the cathode area is larger than the thickness of the cathode base area.

14. The monolayer capacitor element according to claims 1 or 12, wherein an insulating layer is formed by a dielectric oxide layer, and the cathode area and the anode area are separated by the insulating layer.

* * * * *